United States Patent
Shaffer et al.

(10) Patent No.: US 8,331,972 B2
(45) Date of Patent: Dec. 11, 2012

(54) RESOLVING POTENTIAL CONFLICTS IN INTEROPERABILITY COMMUNICATIONS

(75) Inventors: Shmuel Shaffer, Palo Alto, CA (US); Amit Prakash Barave, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 570 days.

(21) Appl. No.: 11/694,334

(22) Filed: Mar. 30, 2007

(65) Prior Publication Data
US 2008/0242247 A1    Oct. 2, 2008

(51) Int. Cl.
*H04B 7/00* (2006.01)

(52) U.S. Cl. ............ 455/519; 455/423; 455/67.11; 455/518

(58) Field of Classification Search .......... 455/509, 455/416, 423, 439, 450, 518, 519; 370/260–262
See application file for complete search history.

(56) References Cited

U.S. PATENT DOCUMENTS

| | | | | |
|---|---|---|---|---|
| 4,831,373 A * | 5/1989 | Hess | | 370/341 |
| 5,564,071 A * | 10/1996 | Liou et al. | | 455/520 |
| 6,298,058 B1 * | 10/2001 | Maher et al. | | 370/390 |
| 6,725,053 B2 * | 4/2004 | Rosen et al. | | 455/518 |
| 6,870,916 B2 * | 3/2005 | Henrikson et al. | | 379/202.01 |
| 2006/0040683 A1 * | 2/2006 | Lappalainen et al. | | 455/466 |

* cited by examiner

*Primary Examiner* — Jinsong Hu
*Assistant Examiner* — San Htun
(74) *Attorney, Agent, or Firm* — Schwegman, Lundberg & Woessner, P.A.

(57) ABSTRACT

A communication device and computerized method to address conflicts in Virtual Talk Groups is provided. The method may comprise accessing a database to monitor resources in a plurality of Virtual Talk Groups (VTG) to detect if there is at least a potential conflict of the resources. When the potential conflict is detected, the method comprises identifying at least one resource which is contributing to the potential conflict, and initiating automatically an electronic communication to identify the potential conflict. In response to the electronic communication, a new VTG may be initiated and terminals of administrators associated with the conflicting resource may be assigned to the new VTG. Each administrator may administer an associated VTG.

21 Claims, 7 Drawing Sheets

RESOLVING POTENTIAL CONFLICTS IN INTEROPERABILITY COMMUNICATIONS

FIELD

This application relates generally to telecommunications and to resolving potential conflicts in interoperability communications.

BACKGROUND

Emergency Response Teams (ERT) utilize Push-To-Talk (PTT) devices to facilitate communication. The convergence of radio PTT and IP (Internet Protocol) networks opens this traditional communication modality to a new era of innovation and scalability. The vast amount of bandwidth enables new functionalities and makes it possible to present multiple channels and Virtual Talk Groups (VTGs) to end users. For example, the Interoperability and Collaboration System (IP-ICS) available from Cisco Systems, Inc. of California introduced the Push-To-Talk Management Center (PMC) client which allows users to participate in up to fifty PTT sessions (e.g., 18 simultaneously). The IPICS system can facilitate communication amongst a few thousand users who are divided into a plurality of virtual talk groups. Each VTG can be controlled by a plurality of dispatchers, operators, system administrators, or the like.

To ensure the integrity of the system, data structures and database activities are protected via transactions. Nevertheless, existing systems do not easily facilitate discussions between administrators who may be issuing conflicting instructions/configurations.

Existing databases may protect the integrity of information by employing transactions. For instance, a first transaction must execute to the end before the next transaction is allowed. The drawback of this method is that some transactions may take a relatively long time to complete, the execution of the next transaction therefore being delayed until the completion of the previous one.

BRIEF DESCRIPTION OF DRAWINGS

Example embodiments are illustrated by way of example and not limitation in the figures of the accompanying drawings, in which like references indicate similar elements and in which.

DETAILED DESCRIPTION OF EXAMPLE EMBODIMENTS

In the following description, for purposes of explanation, numerous specific details are set forth in order to provide a thorough understanding of example embodiments. It will be evident, however, to one skilled in the art that the example embodiments may be practiced without these specific details.

Overview

A communication device and computerized method to address conflicts in Virtual Talk Groups is provided. In one embodiment, the method may comprise accessing a database to monitor resources in a plurality of Virtual Talk Groups (VTG) to detect if there is at least a potential conflict of the resources. When the potential conflict is detected, the method comprises identifying at least one resource which is contributing to the potential conflict, and initiating automatically (e.g. without human intervention) an electronic communication to identify the potential conflict. In response to the electronic communication, a new VTG may be initiated and terminals of administrators associated with the conflicting resource may be assigned to the new VTG. Each administrator may administer an associated VTG.

Although though the following description is explained, by way of example, with reference to Virtual Talk Groups, it should be understood to not be limited to voice communication but rather to encompass all forms of multimedia communications.

DETAILED DESCRIPTION OF THE DRAWINGS

Figure 1:
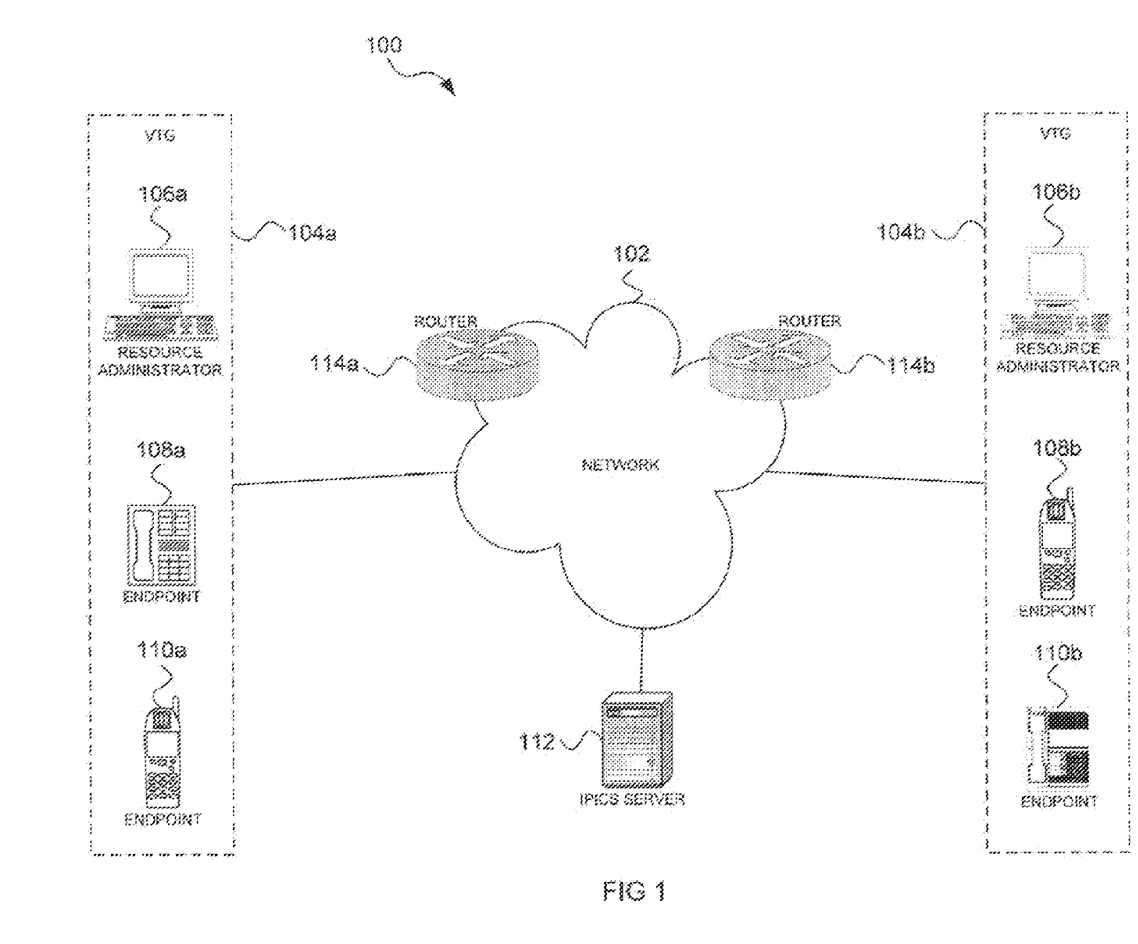
FIG. 1 shows a schematic diagram of an example of a communication system for hosting interoperability communications, in accordance with an example embodiment.

Referring to FIG. 1, reference numeral 100 generally indicates a communication system for hosting multi-party communications particularly in the form of VTGs. The system 100 includes a network 102 which may comprise a plurality of different communications networks, for example a mobile telephone network, a landline telephone network, radio and an IP (Internet Protocol) network. In particular, the network 102 may include the Internet and one or more LANs (Local Area Networks). The network 102 may be operable to transmit data, particularly in the form of multimedia, voice or audio data, for example by breaking the data into IP packets. Further, the network 102 may be a Push-To-Talk compatible network, thereby to facilitate or host a plurality of VTGs operable to communicate using PTT technology (e.g. half-duplex or full-duplex communications).

The system 100 is shown to include a plurality of VTGs, generally indicated by reference numerals 104a, 104b. In general, a VTG may define a communication channel allowing a plurality of endpoint devices to communicate with one another, for example using Push-To-Talk technology. Each VTG 104 may include users, a dispatcher, operator, system administrator, or the like (further referred to collectively as a resource administrator). Each resource administrator may have a resource administrator terminal 106a, 106b including a user interface to receive commands from the resource administrator, for example configuration commands or instructions relating to the configuration or setting of the resource administrator's VTG 104 as well as system resources. The user interface may be in the form of a Web browser with associated input devices (e.g., a mouse and keyboard). Further, the resource administrator terminals 106 may include multimedia capabilities enabling the resource administrator to communicate with other users of the VTG 104.

Each VTG 104 may include, in addition to the resource administrator terminal, a plurality of endpoint devices 108, 110 (only two of which are shown by way of example in FIG. 1). Thus, users of endpoint devices 108, 110 may communicate via the VTG 104 with other users of the same VTG 104.

The system 100 may include an interoperability device, for example in the form of an IPICS (IP Interoperability and Collaboration System) server 112 available from Cisco Systems, Inc. The IPICS server 112 may be operable to host one or more VTGs 104. The network 102 may include a plurality of routers 114 (or other packet forwarding devices, e.g. network switches, or the like) that are each operable to route IP packets thereby facilitating communication amongst the VTGs 104. The system 100 is an interoperability system capable of hosting a plurality of VTGs 104 communicating, for example, using PTT sessions, Voice over IP (VoIP) phones, mobile phones, IM (Instant Messaging) or any other communication modality integrated by the IPICS server 112. Thus, a VTG may comprise communication endpoints that communicated using different modalities.

The system 100 may for example find application for use by Emergency Response Teams. Thus, each VTG 104 may correspond to a different Emergency Response Team, users of the endpoint devices 108, 110 for example being members of the team. The resource administrator or the terminal of the resource administrator 106, collectively referred to as the resource administrator for ease of explanation, may have authority to configure the VTG 104 as well as system resources in accordance with operational requirements of the team, for example being able to select the number and/or identity of endpoint devices 108, 110 and configuring a router 114 and the IPICS server 112 to host the VTG 104 in accordance with operational requirements. Thus, in a system where multiple users, in this case the resource administrators 106, have authority to configure shared or common resources, potential configuration conflicts may exist resulting in a potential conflict state of system. For the purposes of the specification, a potential conflict state includes any actual or potential configuration conflict(s), as well as concurrent configuration changes which may cause undesirable results.

By way of example, Cisco IPICS (e.g. IPICS server 112) may provide the ability for resource administrators 106 to organize or segment different entities, such as agencies, companies, departments, jurisdictions, municipalities, or sites, into separate views which are isolated from each other. In Cisco IPICS, these separate views are known as operational views, or ops views. While these views are maintained separately by the Cisco IPICS system administrator, this functionality also allows multiple entities to use one Cisco IPICS server to enable resource sharing across multiple ops views, according to business or operational needs. The ops views of various resource administrators 106 may overlap (e.g. include overlapping endpoint devices 108, 110 or system resources). Thus, an attempt by the resource administrator 106a to configure his/her particular ops view may result in a potential configuration conflict with one of more of the ops views of another resource administrator 106b.

Figure 2:
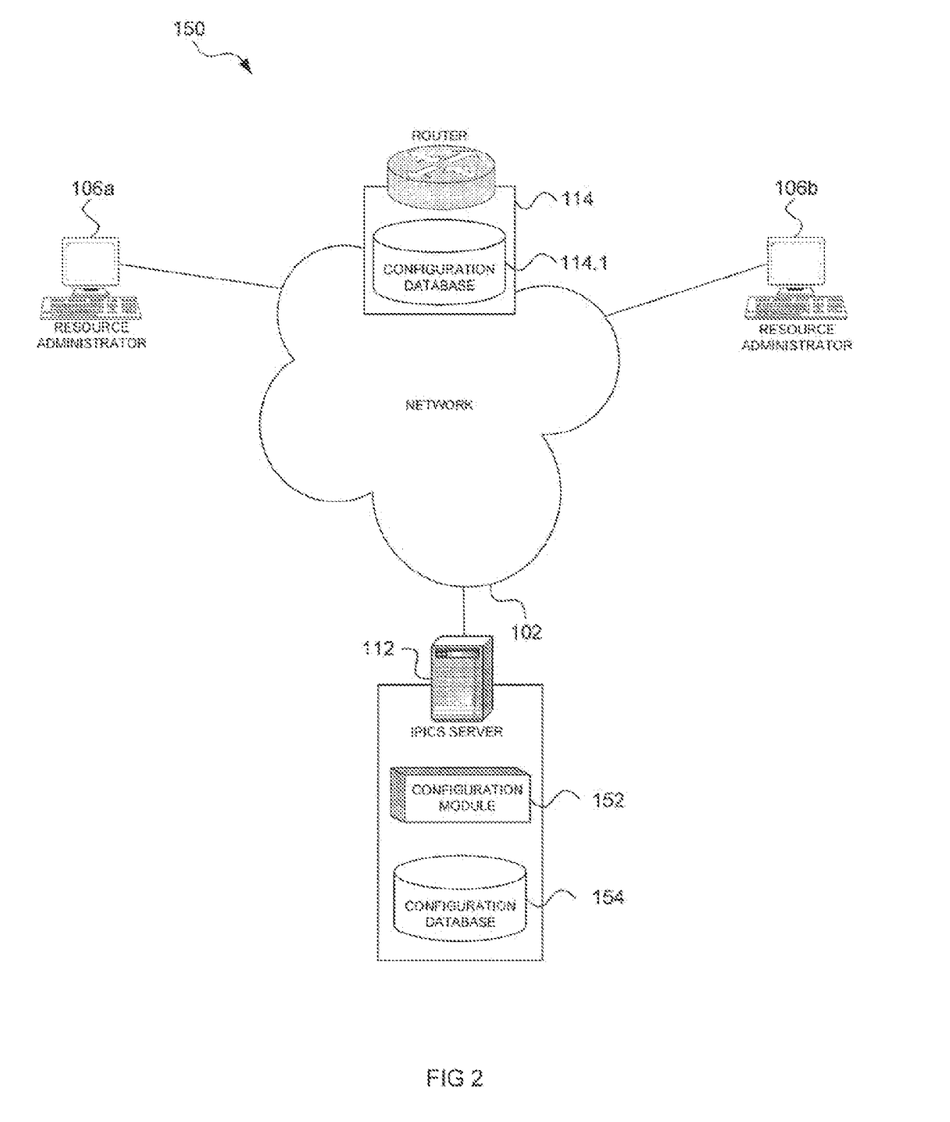
FIG. 2 shows a schematic diagram of portion of the communication system of FIG. 1 in more detail.

Referring now to FIG. 2, an example system 150 is shown, which is a more detailed view of a portion of the system 100. The system 150 is shown to include the IPICS server 112 which, in turn, includes a configuration module 152 and a configuration database 154. The configuration module 152 may be a conceptual module which corresponds to a functional task performed by the IPICS server 112. The various modules as described herein may be implemented is software and/or hardware. Thus, the term "module" is intended to include an independent piece of software which forms part of one or more larger programs. The term "module" is also intended to include (or part thereof) consisting of an assembly of electronic components (e.g., computer hardware).

The router 114 is shown to include its own local configuration database 114.1 which stores thereon configuration settings of the router 114. Via the resource administrator terminals 106, the resource administrators may create and configure VTGs using a Web browser which interfaces with the IPICS server 112. In response to configuration commands from the resource administrator terminals 106, the configuration module 152 is operable to configure VTGs, store their configurations on the configuration database 154 and synchronize the configuration database 154 of the IPICS server 112 with the configuration database 114.1 of the router 114.

The resource administrators (also indicated by reference numerals 106a, 106b) may operate independently from each other and because of this, from time-to-time they may issue conflicting commands. Under certain circumstances, it may be desirable for resource administrators to share resources, for example when conducting joint operations. It is to be understood that system 100 or 150 may include numerous resource administrators and it may be difficult for each resource administrator to know what the others are doing. This problem may be exacerbated when resources, e.g. the router 114 or the IPICS server 112, are shared. Under such conditions, a potential conflict state may be encountered. The term "potential conflict state" is understood to include an attempt by one or more resource administrators to monopolize or otherwise configure a shared resource which may adversely affect any of the configurations made by other resource administrators, such as accessing a database element, e.g. in database 114.1 or database 154, which another resource administrator is also accessing or has recently accessed, configuring settings of a VTG which another resource administrator is concurrently configuring or concurrently using, configuring a system resource (e.g. a dial peer or a loopback) or a router port being used by another resource administrator or VTG, or the like. Thus, the potential conflict state includes not only resource or configuration conflicts, but also concurrent editing or attempting to modify settings of resources which may potentially lead to adverse functioning of a VTG. The potential conflict state may further include a situation where there are three or more VTGs, some of which have common users or endpoints such that an audio loop is created.

Figure 3:
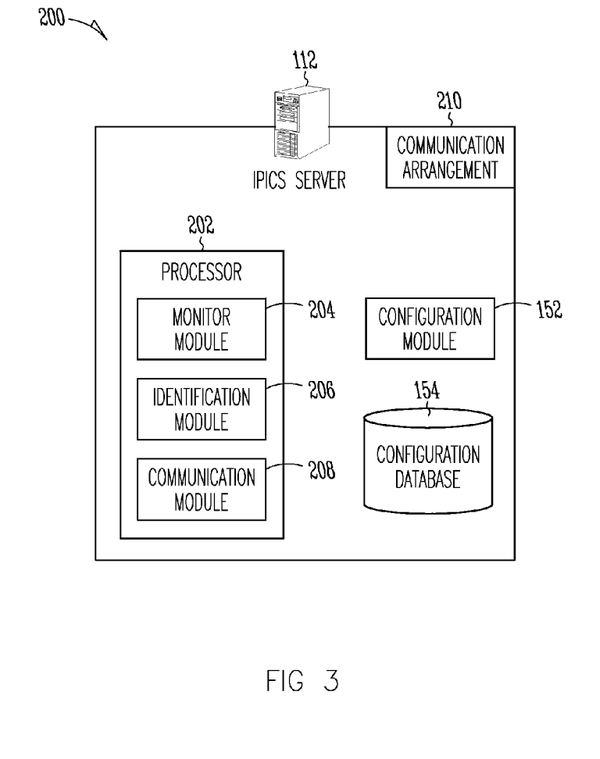
FIG. 3 shows a schematic diagram of a system and device for resolving conflicts in interoperability communications, in accordance with an example embodiment.

Referring now to FIG. 3, reference numeral 200 generally indicates a system for resolving potential conflicts, in accordance as an example embodiment. The system 200 is shown to include various functional modules provided at an IPICS server 112. It is however to be appreciated that the various modules of the system 200 may be distributed amongst one or more different devices, for example a router, an endpoint, a dedicated device, or the like.

A processor 202 is shown to comprise a plurality of conceptual modules which correspond to functional tasks performed by the processor 202. Instructions to direct the operation of the processor 202 may be provided in main memory, and/or a hard disk drive. It is to be understood that one or more processors may be provided. In an example embodiment, the processor 202 may include a monitor module 204 to monitor resources of a communication channel thereby to detect whether or not there is a potential conflict state, an identification module 206 to identify users or endpoints which are contributing to the potential conflict state in response to such a state being detected, and a communication module 208 operable to initiate automatically a communication between the identified users or endpoints. The monitor module 204 may be configured to maintain a log or record of configuration changes or modifications for the purpose of identifying a potential conflict state. The IPICS server 112 is shown further to include a communication arrangement 210 operable to communicate with a network.

For instance, resource administrator terminals 106 may concurrently attempt to edit elements in database 114.1 or database 154, for example by modifying details relating to one or more endpoints 108, 110 or one or more VTGs 104, leading to a potential conflict state. Further, if a resource administrator terminal 106 attempts to open a database or database entry currently open or otherwise being used by another resource administrator 106, this may also lead to a Potential Conflicts State.

Transactions between resource administrators 106 may extend beyond the database, and thus the Potential Conflicts State may include conflicting (or potentially conflicting) configuration updates on the router 114 or the network 102 by one resource administrator 106. For example, one resource administrator 106a may have reserved a dial peer on the router 114 to create VTG 104a. If another resource administrator 106b attempts to configure the same dial peer, a potential conflict state may arise. The same considerations may apply to other resources, for example multicast addresses, loop backs, or the like. Thus, the monitor module 204 may be operable to monitor databases and resources, for example by polling configuration settings continually or intermittently or in response to a configuration change, thereby to detect a potential conflict state.

The identification module 206 may then be operable to identify the users or endpoints, in this case the resource administrator terminals 106, which gave rise to the potential conflict state. For example, one resource administrator terminal 106a may have originally reserved a resource on the router 114 and another resource administrator terminal 106b be may try to claim the same resource. In such a case, the identification module 206 may identify both resource administrators 106.

Once the conflicting resource administrator terminals 106 have been identified, the communication module 208 automatically initiates a communication between the resource administrator terminals 106. In one example embodiment, one or more resource administrators 106 may have associated therewith, in addition to their resource administrator terminals 106, alternate communication endpoints, e.g. a PMC, telephone, radio endpoint (not shown) which does not necessarily form part of the already existing VTG 104. Once the resource administrators 106 have been identified, the communication module 208 may initiate a communication to the alternate communication endpoints. The communication may take the form of communication message, for example and e-mail, an IM (Instant Message) a visual and/or audible prompt, or the like. Instead, or in addition, the communication module 208 may be operable to create automatically a new VTG and join the conflicting resource administrator terminals 106 to the new VTG. This new "conflict resolution VTG" is illustrated by way of example in FIG. 4 and is generally referred to by reference numeral 250. Once this direct line of communication has been initiated between the conflicting resource administrators 106, they may discuss the conflict to determine who has a greater urgency and who should claim the conflicting resource/database entry. If both resource administrators 106 are busy conducting emergency response operations, for example, the resource administrator 106 with the more pressing need (or a resource administrator assigned a higher priority) may claim the resource. Instead, or in addition, the system 200 may include predefined conflict resolution criteria, based on which the system 200 may automatically award one of the resource administrators 106 use of the resource.

Figures 4, 5:
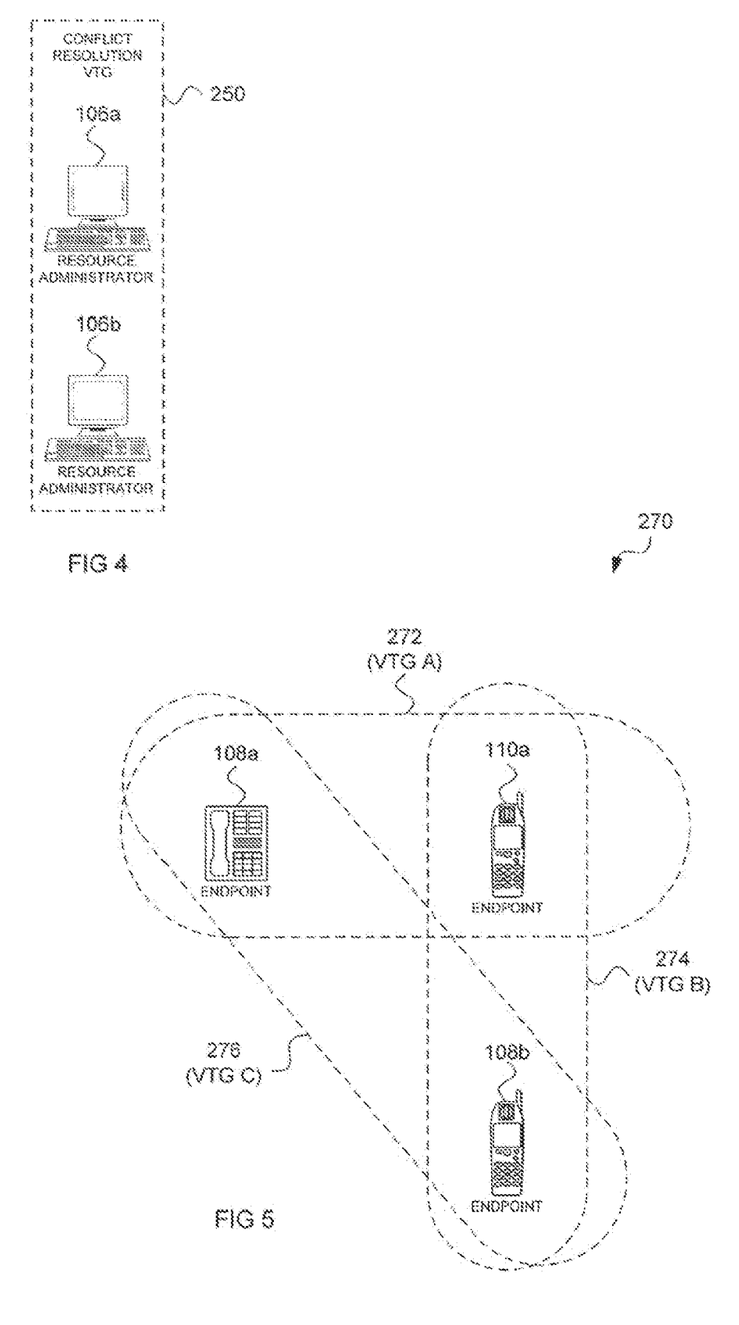
FIG. 4 shows a schematic diagram of a conflict resolution VTG, in accordance with an example embodiment.
FIG. 5 shows a schematic diagram of a plurality of VTGs which cause an audio loop.

FIG. 5 illustrates a further example of a Potential Conflicts State. Three overlapping VTGs are generally indicated by reference numeral 270. The three VTGs create an audio loop (further described below) which is undesirable and is considered a potential conflict state. It is therefore to be appreciated that the potential conflict state not only includes actual resource conflicts, but further includes configurations made concurrently by resource administrators which may lead to undesirable or unpredictable results.

Figure 6:
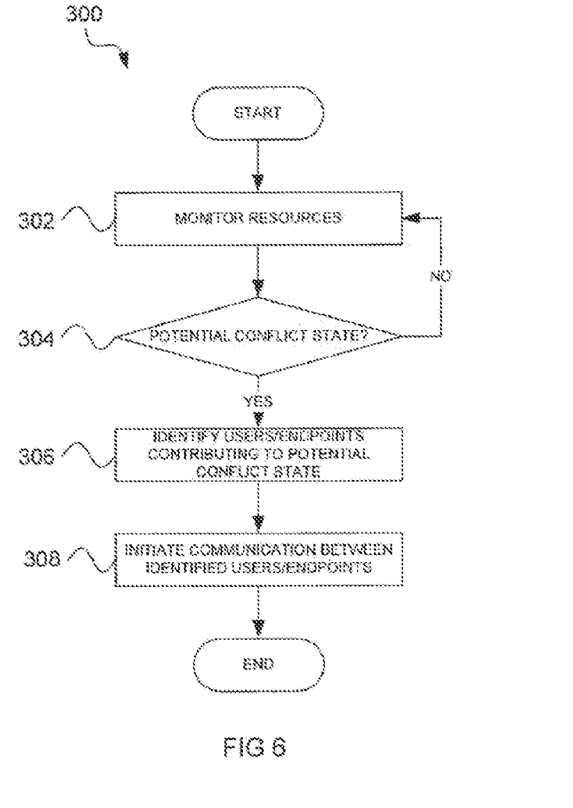
FIG. 6 shows a flow diagram of a high-level method for resolving conflicts in interoperability communications, in accordance with an example embodiment.
Figure 7:
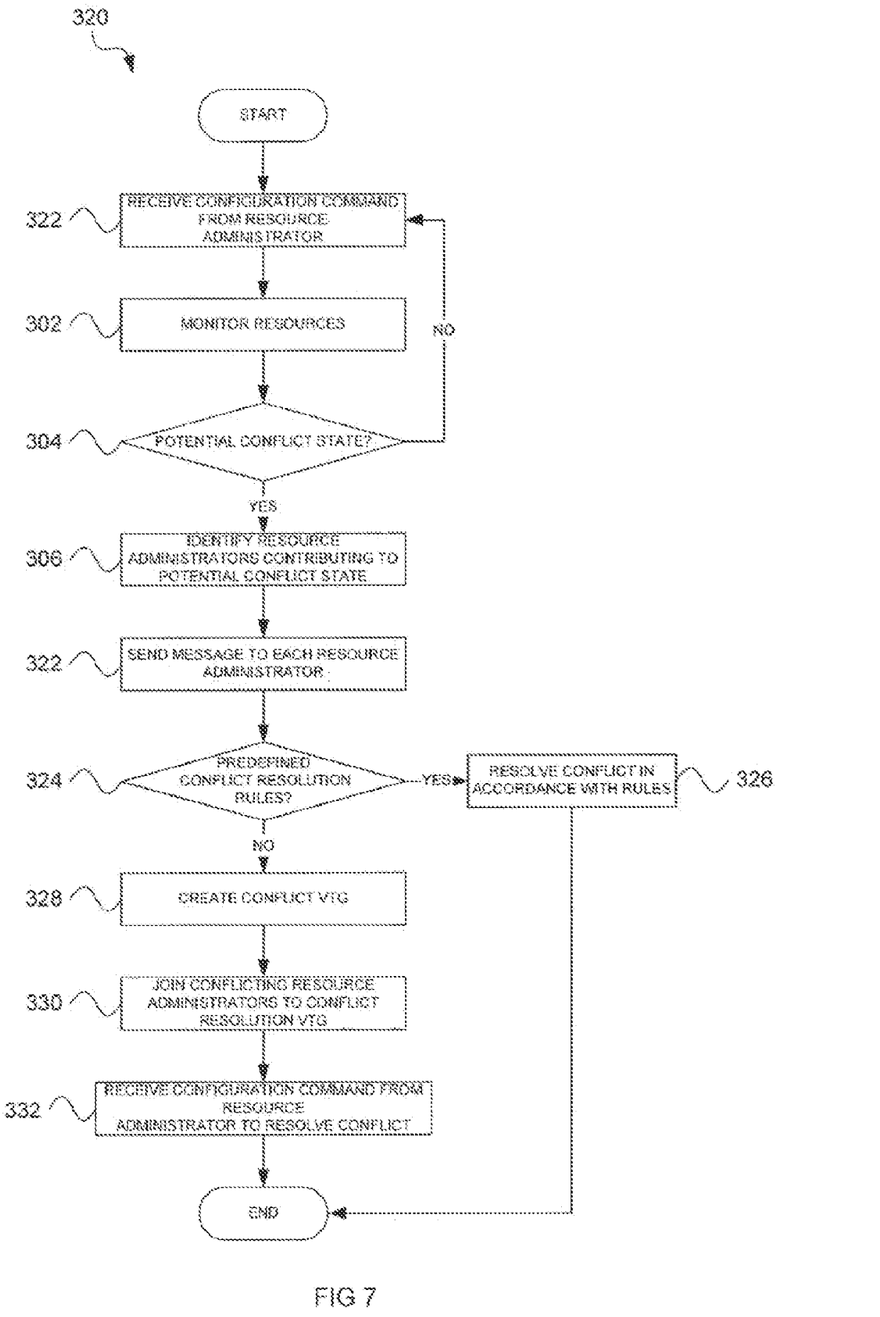
FIG. 7 shows a flow diagrams of a low-level method for resolving conflicts in interoperability communications, in accordance with an example embodiment.

Example embodiments will now be further described in use with reference to FIGS. 6 to 7. Referring now to FIG. 6, reference numeral 300 generally indicates a high-level method for resolving conflicts in interoperability communications systems, in accordance with an example embodiment. Broadly, system resources are monitored, at block 302, to determine, at block 304, whether or not there is a potential conflict state. The resources may be monitored, for example, by continually or intermittently polling various resources of the system to determine if any of the resource settings are in conflict. Instead, every time a resource is being accessed or a configuration change is made, the resources could be monitored to determine if the change brought any of them into conflict.

Once it has been determined that there is a potential conflict state, users/endpoints which contributed to the potential conflict state are identified, at block 306. For example, a user/endpoint which first claimed a resource as its own and a further user/endpoint which subsequently tries to access or claim the same resource may be identified as contributing to the potential conflict state. Next, a communication between the identified users/endpoints is initiated, at block 308. The communication may be in the form of a message or a communication to create a new VTG (further described below).

Referring now to FIG. 7, reference numeral 320 generally indicates a low-level method in accordance with an example embodiment. Similar numerals to FIG. 6 generally indicate similar parts in FIG. 7. Reference is also made to FIGS. 1 to 5, although it is to be appreciated that the method may be deployed on other systems or devices.

As stated above, the system 100, 150 may include a plurality of resource administrators (utilizing resource administrator terminals 106) which are responsible for controlling various VTGs 104 which relate for example to Emergency Response Operations. Thus, the resource administrators 106 may continually need to configure VTGs 104 to respond to the changing nature of an emergency or to carry out routine operations. Input configuration commands may be provided utilizing a graphical user interface such as a Web browser. The IPICS server 112 is shown to receive, at block 322, configuration commands from the resource administrator terminals 106.

The configuration module 152 of the IPICS server 112 may be operable to instantiate the configuration command, for example by updating its own configuration database 154 or the configuration databases 114.1 of any routers 114 on the network 102 hosting the communication channels, and/or by changing the router 114 or network 102 configurations settings (collectively referred to as system resources). The monitor module 204 is operable to monitor, at block 302, the system resources. The monitor module 204 may query or poll the resource continually or intermittently, e.g. at predefined time intervals, or may be triggered to monitor for conflicts in response to the configuration module 152 to perform a configuration update. In another example embodiment, the resources may be programmed to notify the monitor module 204 as soon as they detect a potential conflict state. Regardless of how the monitor module 204 monitors resources, it is operable to detect, at block 304, a potential conflict state. While there is no potential conflict state, the method of 320 may repeat the operations in blocks 322, 302 and 304.

Resource administrators 106 may be assigned joint resources, e.g. router 114, in system 100, 150 so that they may coordinate their respective events. The resource administrators 106 typically cannot see the resources which other resource administrators are using. Because of the urgency and the real-time nature of an evolving event, the two resource administrators 106 may not have had an opportunity manually to conduct checking procedures to identify conflicts that may occur as a result of jointly managed resources. Example potential conflict states will now be described in more detail. In another example embodiment, a higher priority system administrator may need to claim a resource which is currently utilized by a lower priority system administrator for management of another event. The system 100, 150 in accordance with an example embodiment automatically creates a VTG between the two system administrators and allows the higher priority administrator to inform the lower priority administrator that his configurations may be overwritten or some of the resources he is using may be claimed by the higher priority system administrator.

As stated above, a Cisco IPICS server may provide an interactive ops view to resource administrators 106. For example, the resource administrator 106a may have an ops view of the resources available to him. The resource administrator 106a may activate VTG 104a by selecting a dial peer port which is shown to be available in his ops view which results, for example, in a specific loopback L1 (not shown) dial peer port (e.g. port 22—not shown) getting patched with a particular multicast address (e.g. multicast address A—not shown). The IPICS server 112 may thus receive, at block 322, an appropriate configuration command from resource administrator 106a.

During this activation of VTG 104a, resource administrator 106b may try to activate VTG 104b. His ops view may also show that dial peer port 22 is still available, and if he selects this dial peer port, it would need to get patched with a new multicast address (e.g. multicast address B—not shown).

As stated above, the monitor module 204 of the IPICS server 112 monitors, at block 302, system resources which include dial peer ports in order to determine, at block 304, if there is a potential conflict state. In this example, a potential conflict state has been detected due to the resource administrators 106 attempting to attach different multicast addresses to the same dial peer port. The identification module 206 identifies, at block 306, the resource administrators who are contributing to the potential conflict state, which in this case are resource administrator 106a and resource administrator 106b.

A message or prompt is sent, at block 322, by the communication module 208 to each resource administrator 106 informing them of the nature of the potential conflict. The prompt may be in the form of a text message (e.g. an e-mail or an IM) or an audio message, for example using a Text-To-Speech converter. If desired, the message may also propose steps which could be taken to resolve conflict.

Optionally, the IPICS server 112 could include, at block 324, predefined conflict resolution rules or policies to resolve the conflict automatically. If such conflict resolution rules are present, the IPICS server 112 may automatically resolve the conflict by assigning a multicast address to dial peer port 22 in accordance with the resource administrator 106 determined by the rules, for example the resource administrator 106 having the higher priority.

Alternatively, the IPICS server 112 can create or activate, at block 328, a new, ad hoc VTG 250 (see FIG. 4) and join, at block 330, both resource administrators 106 to the conflict resolution VTG 250. The resource administrators 106 may then discuss the conflict to determine how best to resolve it. For example, they may agree that the resource administrator 106 with the most pressing emergency can use dial peer port 22. In such a case, one of the resource administrators may then issue a configuration command which the IPICS server 112 receives, at block 332, and accordingly resolved the conflict.

Another example potential conflict state is that illustrated in FIG. 5. For example, resource administrator 106a may set up VTG A 272 comprising endpoint devices 108a, 110a. He may then set up VTG B 274 comprising endpoint devices 110a, 108b. Thus, VTGs A 272 and B 274 have a common endpoint device 110a. This may be desirable in certain situations, for example if the user of endpoint device 110a is an operative in the field and needs to report to multiple VTGs. All the while, the system resources are being monitored, at block 302, but there is not yet a potential conflict state.

Resource administrator 106b may be unaware of the existence of VTG A 272 and VTG B 274 and may attempt to set up VTG C 276 comprising endpoint devices 108. This may be undesirable because, effectively, traffic sent to VTG A 272 is forwarded to the VTG B 274 through endpoint device 110a. The same traffic is then forwarded from VTG B 274 to VTG C 276 via endpoint device 108b and then back to VTG A 272 via endpoint device 108a. An audio loop has thus been created and traffic will keep the looping thereby causing audio chirping, echoes and general degradation of audio quality. The monitor module 204 may thus determine, at block 304, that an attempt is being made to create VTG C 276 which may result in a potential conflict state. As above described, the resource administrator terminals 106 are identified, a message or prompt is sent, at block 322, by the communication module 208 to each resource administrator, at a corresponding resource administrator terminal 106, informing them of the nature of the potential conflict (audio loop), conflict resolution VTG 250 is created, at block 328, the conflicting resource administrator terminals 106 are joined, at block 330, to the conflict resolution VTG 250 and a configuration command may be received from one of the resource administrator terminals 106 to resolve the conflict (e.g. to remove or modify one of the VTGs 272, 274, 276).

In another example embodiment, a potential conflict state may include configuration changes which are attempted within a given brief period of time. For example, resource administrator 106a may edit details relating to or profile of endpoint device 108a on the configuration database 154. The other resource administrator 106b may be unaware of this, and may within a brief period of time, e.g. 10 seconds or one minute, attempt to edit the same details. The monitor module 204 may then determine, at block 304, that there is a potential conflict state which may be resolved in accordance with method 320.

Thus, advantages of example embodiments may include early detection of potential configuration conflicts before the configuration of network devices, e.g. IPICS server 112 or router 114, are updated. The configuration updates may be time-consuming and are preferably executed in an atomic fashion, early detection of conflicts that are being useful before a configuration update is attempted. Further, the system 100, 150, 200 may inform the resource administrators 106 of the nature of the conflict and may even suggest a potential solution, the resource administrators 106 thus being in a position to resolve the conflict. Further, a conflict resolution VTG 250 may be provided which facilitates communication between the resource administrators 106 thereby to resolve the conflict.

Figure 8:
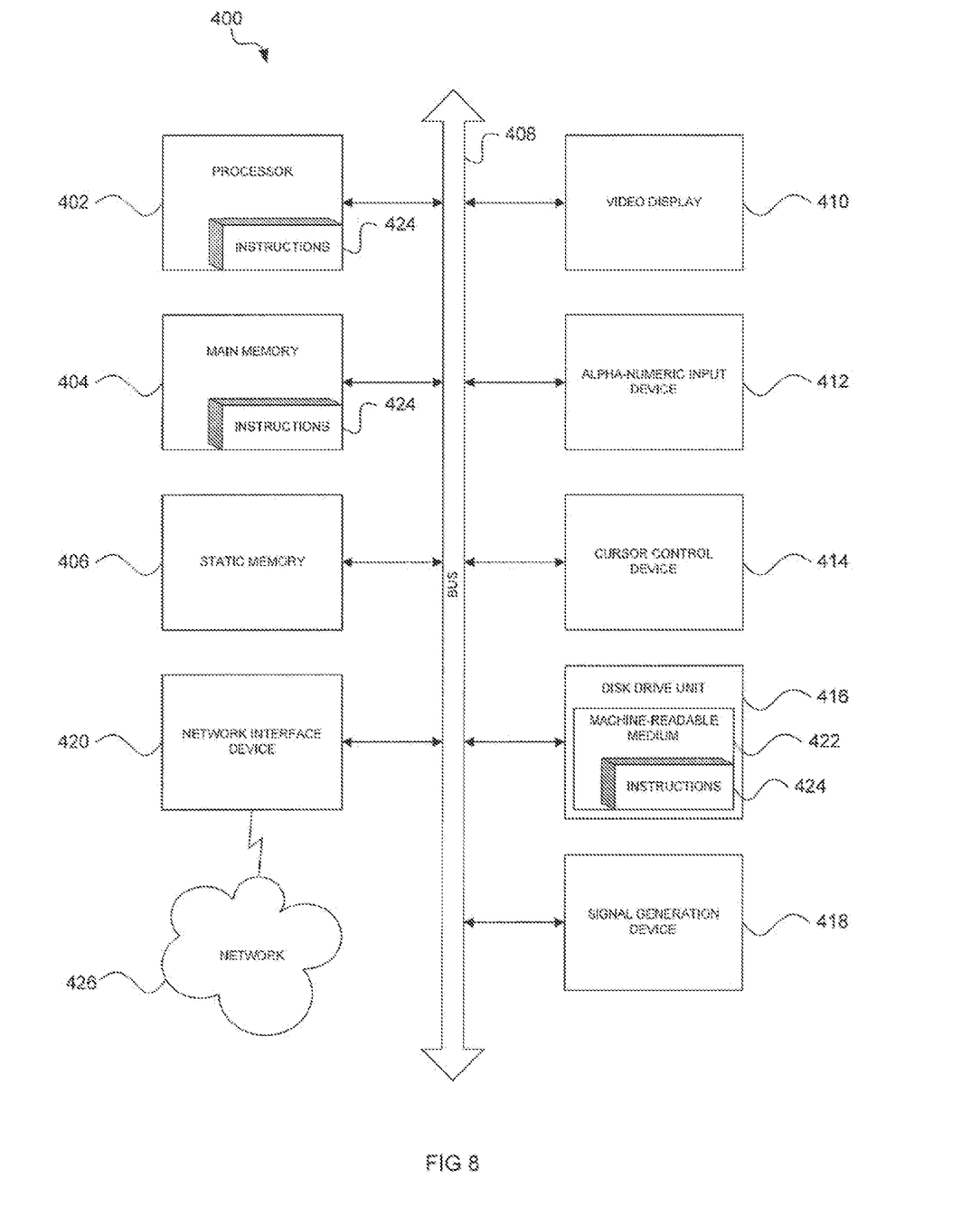
FIG. 8 shows a diagrammatic representation of a machine in the example form of a computer system within which a set of instructions, for causing the machine to perform any one or more of the methodologies discussed herein, may be executed.

FIG. 8 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or digital signal processor (DSP) or any combination thereof), a main memory 404 and a static memory 406, which communicate with each other via a bus 408. The computer system 400 may further include a video display unit 410 (e.g., a liquid crystal display (LCD), plasma display or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., FTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present embodiments, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Any of the devices described example embodiments, e.g. IPICS server 112, resource administrator terminals 106 and endpoint devices 108, 110 and/or router 114 could be in the form of machine 400.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computerized method comprising:
   accessing a database to monitor system resources in a plurality of Virtual Talk Groups (VTGs), each VTG being supported by associated system resources of a communication system for hosting interoperability communications, at least some of the system resources being shared by two or more of the plurality of VTGs, each VTG having an associated human administrator that has configuration authority over the associated system resources, so that two or more respective human administrators of the two or more VTGs have overlapping configuration authority over the shared system resources;
   detecting a configuration command with respect to the shared system resources by one of the two or more human administrators;
   before a configuration update of the shared system resources in accordance with the configuration command is attempted, detecting a potential configuration conflict that comprises conflicting configuration of the shared system resources that would result from updating configuration of the shared system resources in accordance with the configuration command; and
   responsive to detecting the potential configuration conflict, automatically initiating an electronic communication with respect to communication devices associated with the two or more human administrators, to facilitate or establish a direct line of communication between the two or more human administrators for resolution of the potential configuration conflict.

2. The method of claim 1, wherein the initiating of the electronic communication comprises:
   initiating a new VTG; and
   assigning terminals of the two or more human administrators to the new VTG.

3. The method of claim 2, further comprising communicating a notification of the nature of the potential configuration conflict via the new VTG to the two or more human administrators.

4. The method of claim 1, wherein the shared system resources are network device resources.

5. The method of claim 1, wherein the network device resources are databases resources or router configuration resources.

6. The method of claim 1, further comprising:
identifying a rule associated with the potential configuration conflict; and
automatically resolving the potential configuration conflict based on the identified rule.

7. The method of claim 1, further comprising:
monitoring reconfiguration of the shared system resources; and
initiating the electronic communication when resources are reconfigured before a predetermined time period has lapsed.

8. The method of claim 7, wherein the monitoring of the reconfiguration of the shared system resources comprises maintaining a log of modifications made to allocation of the shared system resources, the log being to identify at least one resource contributing to the potential configuration conflict.

9. The method of claim 1, wherein the two or more VTGs comprise resources associated with a particular operation.

10. The method of claim 1, further comprising identifying at least one resource which is contributing to the potential configuration conflict, the automatically initiated the electronic communication including notification to the two or more human administrators of the identity of the at least one resource.

11. A communication device comprising:
a monitor module to:
monitor system resources in a plurality of Virtual Talk Groups (VTGs), each VTG being supported by associated system resources of a communication system for hosting interoperability communications, at least some of the system resources being shared by two or more of the plurality of VTGs, each VTG having an associated human administrator that has configuration authority over the associated system resources, so that two or more respective human administrators of the two or more VTGs have overlapping configuration authority over the shared system resources;
detect a configuration command with respect to the shared system resources by one of the two or more human administrators; and
detect, before a configuration update of the shared system resources in accordance with the configuration command is attempted, a potential configuration conflict that comprises conflicting configuration of the shared system resources that would result from updating configuration of the shared system resources in accordance with the configuration command; and
a communication module to automatically initiate an electronic communication responsive to detection of the potential configuration conflict, to facilitate or establish a direct line of communication between the two or more human administrators for resolution of the potential configuration conflict.

12. The communication device of claim 11, further comprising a configuration module to:
initiate a new VTG; and
assign terminals of the two or more human administrators to the new VTG.

13. The communication device of claim 12, wherein the communication module is configured to communicate a notification of the new VTG to the terminals to notify the two or more human administrators of the existence of the potential configuration conflict.

14. The communication device of claim 11, wherein the shared system resources are network device resources.

15. The communication device of claim 14, wherein the network device resources are databases resources or router configuration resources.

16. The communication device of claim 11, wherein the configuration module is arranged to:
identify a rule associated with the potential configuration conflict; and
automatically resolve the potential configuration conflict based on the identified rule.

17. The communication device of claim 11, wherein the monitor module monitors reconfiguration of the shared system resources, the device further comprising a timer to time when a predetermined time period has lapsed, the electronic communication being initiated only when resources are reconfigured before the predetermined time period has lapsed.

18. The communication device of claim 17, wherein the monitor module is configured to maintain a log of modifications made to allocation of the shared system resources, the log being to identify at least one resource contributing to the potential configuration conflict.

19. The communication device of claim 11, wherein the two or more VTGs comprise resources associated with a particular operation.

20. The communication device of claim 11, wherein the monitor module is further configured to identify at least one resource which is contributing to the potential configuration conflict, the communication module being configured such that the electronic communications includes a notification to the two or more human administrators of the identity of the at least one resource.

21. An apparatus which comprises:
means for accessing a database to monitor system resources in a plurality of Virtual Talk Groups (VTGs), each VTG being supported by associated system resources of a communication system for hosting interoperability communications, at least some of the system resources being shared by two or more of the plurality of VTGs, each VTG having an associated human administrator that has configuration authority over the associated system resources, so that two or more respective human administrators of the two or more VTGs have overlapping configuration authority over the shared system resources;
means for detecting a configuration command with respect to the shared system resources by one of the two or more human administrators;
means for detecting, before a configuration update of the shared system resources in accordance with the configuration command is attempted, a potential configuration conflict that comprises conflicting configuration of the shared system resources that would result from updating configuration of the shared system resources in accordance with the configuration command; and
means for, responsive to detecting the potential configuration conflict, automatically initiating an electronic communication with respect to communication devices associated with the two or more human administrators, to facilitate or establish a direct line of communication between the two or more human administrators for resolution of the potential configuration conflict.

* * * * *

UNITED STATES PATENT AND TRADEMARK OFFICE
CERTIFICATE OF CORRECTION

PATENT NO. : 8,331,972 B2  
APPLICATION NO. : 11/694334  
DATED : December 11, 2012  
INVENTOR(S) : Shaffer et al.

Page 1 of 1

It is certified that error appears in the above-identified patent and that said Letters Patent is hereby corrected as shown below:

In column 12, line 56-57, in Claim 20, delete "command; and" and insert --command; and--, therefor.

Signed and Sealed this  
Nineteenth Day of March, 2013

Teresa Stanek Rea  
*Acting Director of the United States Patent and Trademark Office*